(12) United States Patent  
Goldner et al.

(10) Patent No.: US 8,880,023 B2
(45) Date of Patent: Nov. 4, 2014

(54) DEVICE, SYSTEM, AND METHOD OF CELLULAR TRAFFIC MONITORING

(75) Inventors: Alla Goldner, Tel Aviv (IL); Asaf Shahar, Kfar Saba (IL)

(73) Assignee: Allot Communications Ltd., Hod-Hasharon (IL)

( * ) Notice: Subject to any disclaimer, the term of this patent is extended or adjusted under 35 U.S.C. 154(b) by 188 days.

(21) Appl. No.: 13/313,134

(22) Filed: Dec. 7, 2011

(65) Prior Publication Data

US 2012/0220330 A1 Aug. 30, 2012

Related U.S. Application Data

(60) Provisional application No. 61/457,014, filed on Dec. 9, 2010.

(51) Int. Cl.
| | |
|---|---|
| *H04W 4/24* | (2009.01) |
| *H04M 15/00* | (2006.01) |
| *H04L 12/14* | (2006.01) |
| *H04W 40/00* | (2009.01) |
| *H04L 12/725* | (2013.01) |

(52) U.S. Cl.
CPC ............ *H04W 40/00* (2013.01); *H04W 4/24* (2013.01); *H04L 12/1407* (2013.01); *H04L 45/302* (2013.01); *H04L 45/306* (2013.01); *H04M 15/07* (2013.01); *H04M 15/41* (2013.01); *H04M 15/64* (2013.01); *H04M 15/65* (2013.01); *H04M 15/66* (2013.01)

USPC .......................................................... 455/406

(58) Field of Classification Search
None
See application file for complete search history.

(56) References Cited

U.S. PATENT DOCUMENTS

| | | |
|---|---|---|
| 6,347,224 B1 | 2/2002 | Smyth et al. |
| 2009/0141625 A1 | 6/2009 | Ghai et al. |
| 2010/0191612 A1* | 7/2010 | Raleigh .................. 455/405 X |
| 2010/0287121 A1 | 11/2010 | Li et al. |

OTHER PUBLICATIONS

International Search Report for application PCT/IB2011/055530 dated May 16, 2012.

* cited by examiner

*Primary Examiner* — Philip Sobutka
(74) *Attorney, Agent, or Firm* — Eitan, Mehulal & Sadot

(57) ABSTRACT

The present invention provides a cellular traffic monitoring system, which includes: a traffic detection function (TDF) module to monitor cellular traffic associated with a cellular subscriber device, and to generate detection output which includes at least one of: a type of an application associated with said cellular traffic of said cellular subscriber device, and a type of said cellular traffic of said cellular subscriber device. The further includes a policy charging and enforcement function (PCEF) module to enforce one or more charging rules to said cellular subscriber device, based on said detection output.

20 Claims, 10 Drawing Sheets

DEVICE, SYSTEM, AND METHOD OF CELLULAR TRAFFIC MONITORING

PRIOR APPLICATION DATA

This application claims priority and benefit from U.S. Provisional Patent Application No. 61/457,014, filed on Dec. 9, 2010, which is hereby incorporated by reference in its entirety.

FIELD

The present invention is related to the field of wireless communication.

BACKGROUND

Many users utilize laptop computers and Personal Computers (PCs) in order to access the Internet, browse websites on the World Wide Web, send and receive electronic mail (email), perform online transactions, and engage in various other online activities. Typically, such laptop computer or PC may be connected to the Internet through a wired link or through a wireless communication link. For example, a laptop computer may connect to the Internet by utilizing one or more IEEE 802.11 wireless communication standards or protocols ("Wi-Fi"), by utilizing one or more IEEE 802.16 wireless communication standards or protocols ("Wi-Max"), or by utilizing other suitable communication standards or protocols.

In the last few years, smartphones have been introduced and have become increasingly popular. A smartphone is a hybrid mobile device which combines functions of a cellular phone with functions of a Personal Digital Assistant (PDA). Furthermore, some smartphones may include, for example, a built-in camera able to capture photographs and video clips, a high-resolution color screen able to playback videos, Global Positioning System (GPS) navigation capabilities, and/or other advanced features.

SUMMARY

In accordance with the present invention, for example, a cellular traffic monitoring system which may include a traffic detection function (TDF) module to monitor cellular traffic associated with a cellular subscriber device, and to generate detection output which includes at least one of: a type of an application associated with said cellular traffic of said cellular subscriber device, and a type of said cellular traffic of said cellular subscriber device. The system may further include a policy charging and enforcement function (PCEF) module to enforce one or more charging rules to said cellular subscriber device, based on said detection output.

In accordance with the present invention, for example, the system may further include an online charging server (OCS) to receive the detection output from the TDF module and to perform online charging.

In accordance with the present invention, for example, the system may further include an offline charging server (OFCS) to receive the detection output from the TDF module and to perform offline charging.

In accordance with the present invention, for example, the system may further include a policy and charging rules function (PCRF) module to create a set of application detection and control (ADC) rules, and to provide the ADC rules to be enforced by the PCEF module based on said detection output.

In accordance with the present invention, for example, the ADC rules may include one or more traffic routing rules.

In accordance with the present invention, for example, the ADC rules may include one or more traffic steering rules.

In accordance with the present invention, for example, the ADC rules may include one or more traffic offloading rules.

In accordance with the present invention, for example, the ADC rules may include one or more rules indicating that one or more supplemental services are to be applied to said cellular traffic.

In accordance with the present invention, for example, the one or more supplemental services may include one or more services selected from the group consisting of: parental control service, content filtering service, anti-virus services, anti-malware service, quality of service (QoS) enforcement service, and bandwidth limiting service.

In accordance with the present invention, for example, the ADC rules may include one or more rules for generating usage monitoring reports.

In accordance with the present invention, for example, the TDF module may be in direct communication with at least one of: an online charging server (OCS) of said system; an offline charging server (OFCS) of said system; a billing domain of said system.

In accordance with the present invention, for example, the TDF module may include a payload data inspector to generate the detection output by utilizing a payload data inspection technique.

In accordance with the present invention, for example, the system may further include a first policy and charging rules function (PCRF) module, located in a first cellular network, to create a set of application detection and control (ADC) rules applicable to the first cellular network, and to transfer the ADC rules to a second PCRF module located in a second cellular network.

In accordance with the present invention, for example, the second PCRF module may enforce, in the second cellular network, the ADC rules received from the first PCRF module and generated in the first cellular network.

In accordance with the present invention, for example, the PCEF module may be comprised in a cellular gateway.

In accordance with the present invention, for example, the TDF module may perform traffic offloading to an offloading network based on said detection output.

In accordance with the present invention, for example, the TDF module may steer traffic from a home packet data network (PDN) to a local breakout.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that users are increasingly utilizing smartphones in order to access the Internet and to engage in various types of online activities. Applicants have realized that it may be beneficial for cellular service providers to detect such Internet utilization which is performed via smartphones or other mobile devices, and to perform one or more particular operations in response to such detections. Such operations may include for example, traffic steering; generation of usage monitoring reports; charging operations; and/or supplemental services, e.g., content filtering, anti-virus scanning, or the like.

Figure 1A:
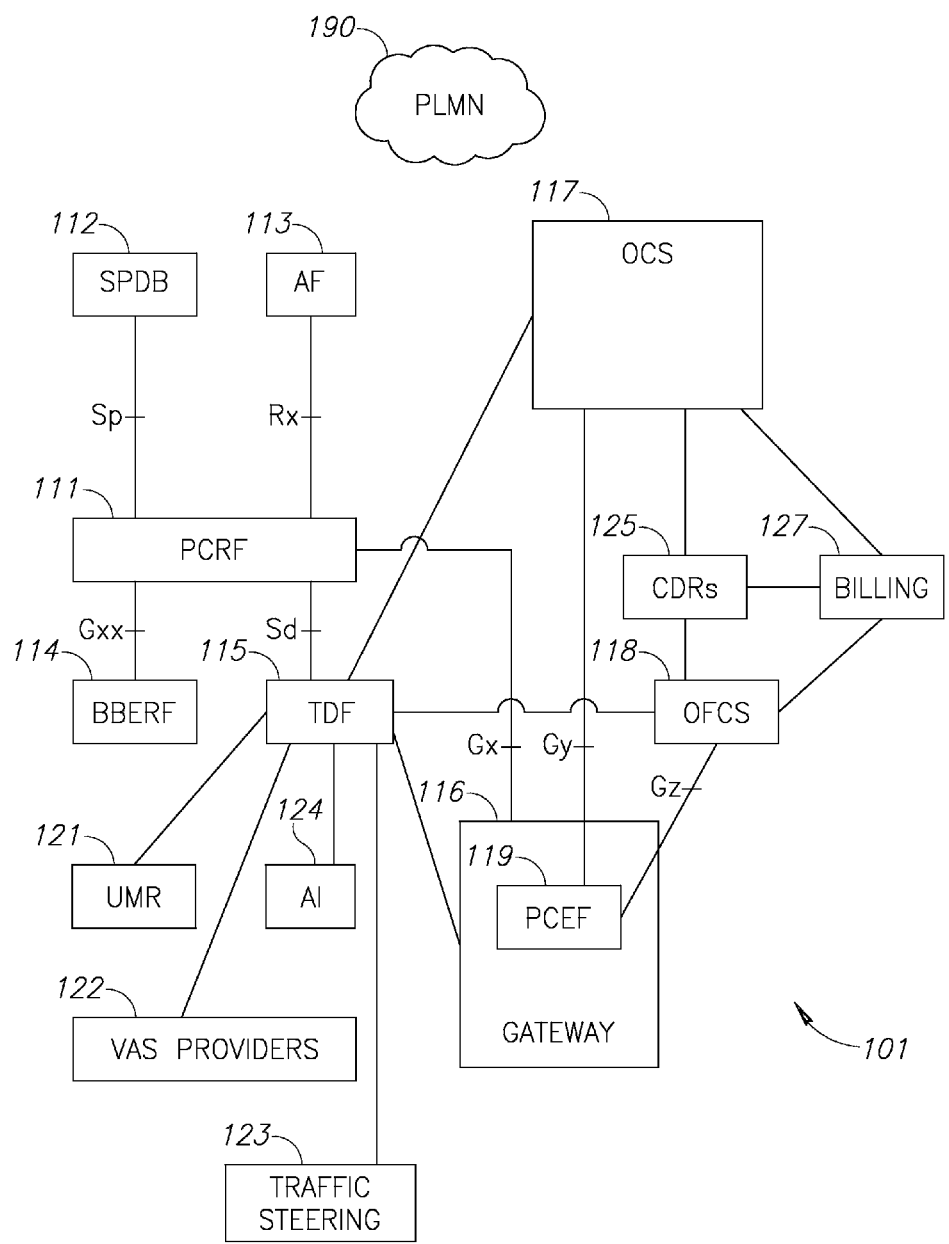
FIGS. 1A-1C are schematic block-diagram illustrations of communication systems in accordance with the present invention.

Reference is made to FIG. 1A, which is a schematic block-diagram illustration of a communication system 101 in accordance with the present invention. System 101 may be part of, or may be associated with, a cellular communication network, for example, a Public Land Mobile Network (PLMN) 190; and may demonstrate the logical architecture of Policy and Charging Control (PCC) in a non-roaming scenario. PLMN 190 may include at least one cell site (not shown), which in turn may include at least one cell radio (not shown). PLMN 190 may further include one or more cellular subscribers (not shown).

System 101 may include, for example, a Policy and Charging Rules Function (PCRF) 111 which may be in communication with a Subscriber Profile Database (SPDB) 112, an Application Function (AF) 113, a Bearer Binding and Event Reporting Function (BBERF) 114, a Traffic Detection Function (TDF) 115, and a cellular gateway 116. System 101 may further include an Online Charging System (OCS) 117, and an Offline Charging System (OFCS) 118. Each one of the components of system 101 may be implemented by utilizing suitable hardware components and/or software components, for example, processors, memory units, storage units, network elements, transmitters, receivers, transceivers, Operating System (OS), applications, or the like.

Policy and Charging Rules Function (PCRF) 111 may aggregate data about network traffic, may take into account data from Subscriber Profile Database (SPDB) 112, and may generate traffic-handling rules and/or decisions related to a particular subscriber. In conjunction with such rules and/or decisions, Traffic Detection Function (TDF) 115 may detect an application that a particular subscriber may be running, and may enforce traffic-handling rules or other suitable rules (e.g., charging, supplemental services, or the like), optionally utilizing cellular gateway 116 and/or a Policy and Enforcement Charging Function (PCEF) 119 which may be included therein.

The present invention may include, for example, traffic detection functionality used for charging, usage monitoring report, additional services, and/or traffic steering; as well as traffic detection functionality with application-based charging considerations. The present invention may be used in conjunction with various types of mobile networks, cellular networks, or wireless communication networks. Particularly, the present invention may be used in conjunction with a cellular network that includes QoS features; a cellular network in which the quality of an application, as perceived by a subscriber, depends on the available bitrate and/or depends on link condition; a cellular network in which TDF 115 is deployed within the cellular network itself; a cellular network in which different rate conditions apply to different subscribers, and/or apply to different applications used by subscribers. The present invention may allow coupling of charging report functionality and traffic detection functionality, for example, in order to charge different subscribers and different applications by using different rates.

In accordance with the present invention, TDF 115 may be deployed in a cellular network if detection of application is required, and optionally, if enforcement of the flows belonging or corresponding to the application is required. The enforcement operations may include, for example, gating or blocking of flows; bandwidth limitation of flows; redirection of flows (e.g., to a captive portal); and/or other suitable operations.

The present invention may allow a mobile network operator to determine who (e.g., which subscriber, and which subscriber application) may be targeted for applying the functionality of TDF 115. For example, the mobile network operator may differentiate between subscribers and applicative activity, based to business arrangements or considerations (e.g., subscriber package), based on different device usage, based on different locations, based on different (applicative) service, and/or other suitable factors.

Optionally, a mobile network operator may define a requirement to charge differently for usage of different applications. Such applications may be detected by TDF 115, and the differential charging requirement may be enforced by TDF 115 and/or by PCEF 119. Furthermore, TDF 115 may monitor the usage (e.g., by accumulating used units), and may report the usage to OCS 117 (for online charging) and/or to OFCS 118 (for offline charging). Optionally, a Usage Monitoring and Reporting (UMR) module 121 may be included in TDF 115 as a sub-unit, or may be implemented as a separate module or unit which may be associated with TDF 115.

Optionally, a mobile network operator may define a requirement to provide usage monitoring report to PCRF 111 or to other policy server, for example, for purposes of fair usage of different applications among different subscribers. Such applications may be detected by TDF 115, which may monitor the usage (e.g., by accumulating used volume), and may report the usage to PCRF 111 or to other policy server. Optionally, the usage monitoring and reporting operations may be performed by UMR module 121.

Optionally, a mobile network operator may define a requirement to support or provide additional services for specific subscribers or types of subscribers (e.g., to provide parental control with regard to subscribers that are minor) and/or for specific applications (e.g., YouTube) or types of applications (e.g., streaming video applications). If such subscriber connects to the network, and/or if such applications are detected, then TDF 115 may provide such Value Added Services (VAS), or may route the traffic to allow the provision of such VAS by one or more other network elements or functional entities which may be implemented as one or more VAS providers 122 or VAS providing units.

Optionally, a mobile network operator may define a requirement to optimally route or steer traffic based on the type of application being used by the subscriber. Such requirement may be enforced by TDF 115, or by a traffic steering module 123 which me be associated with RDF 115. For example, TDF 115 or traffic steering module 123 may route or steer traffic, associated with a particular application or with a type of applications, to another network; or may route or steer such traffic from a home Packet Data Network (PDN) gateway to a local breakout; or may otherwise devise and implement a traffic shortcut which may not require traffic to travel through a backbone pipeline; or may perform other traffic offloading operations, for example, by routing traffic directly (e.g., to Internet backbone) instead of indirectly (e.g., through a cellular operator's core cellular network).

PCRF 111 may include, for example, a network element or node or component which may aggregate information flowing within system 101, or flowing to or from a cellular communication network. For example, system 101 may be part of such cellular communication network, or may be associated with such cellular communication network. PCRF 111 may optionally aggregate data from other sources, for example, an operational support system, a network portal. Based on the aggregated information, PCRF 111 may create rules and generate policy decisions for each subscriber active on the cellular network. Accordingly, PCRF 111 may generate different decisions with regard to different subscribers, for example, providing an increased level or a reduced level of Quality of Service (QoS) to one or more subscribers or set of subscribers, charging a subscriber an increased rate or a supplemental price due to utilization of a particular application or due to engagement in a particular online activity, or the like. PCRF 111 may be implemented, for example, as a stand-alone entity or network element in a cellular network; or may be co-located with one or more other elements (e.g., with TDF 115) within the same entity or network element.

SPDB 112 may include one or more databases or repositories storing data of cellular subscriber profiles, or storing subscriber-related and/or subscription-related information which may be utilized for creation and/or implementations of subscription-based policies. Optionally, SPDB 112 may be combined with, or distributed across, one or more other databases in system 101 and/or in a cellular network that system 101 may be part of or associate with. SPDB 112 may be implemented, for example, as a Subscriber Profile Repository (SPR) and/or a User Data Repository (UDR). SPDB 112 may store, for example, subscriber data, subscription data, service configurations, allocated plan prices, and/or other subscriber-related or subscription-related data.

Optionally, SPDB 112 may store, for example, one or more of the following data items or records: data indicating a subscriber's allowed services and/or a subscriber's disallowed services; for each allowed service, an indication of a pre-emption priority; information on a subscriber's allowed QoS or required QoS; an indication of subscribed guaranteed bandwidth and a QoS level associated therewith; a subscriber's charging-related information (e.g., location information which may be relevant for charging); a subscriber's Closed Subscriber Group (CGS) information reporting rules; a subscriber category; a subscriber's usage monitoring related information; a Multimedia Priority Service (MPS) priority level; a MPS Evolved Packet System (EPS) priority data; an Internet Protocol (IP) Multimedia Subsystem (IMS) signaling priority data; a subscriber's profile configuration indicating whether application detection and control is to be enabled or disabled; a spending limits profile, optionally including, for example, an indication that policy decisions may be based on policy counters available at a CS that may have a spending limit associated with it and optionally including lists or data of the a policy counter; a sponsored data connectivity profile information (which may optionally be locally configured at PCRF 111); and/or a list of Application Service Providers (ASPs) and their applications per sponsor identity.

It is noted that SPDB 112 may be accessible by other components of system 101, for example, by OCS 117 and/or by OFCS 118. Such additional links to SPDB 112 are not shown in FIG. 1A, as to not over-crowd the drawing.

AF 113 may include one or more applications which may utilize dynamic policy and/or charging control. AF 113 may communicate with PCRF 111 to transfer dynamic session information, which may be taken into account for decision-making operations of PCRF 111. AF 113 may receive from PCRF 111, for example, Internet Protocol Connectivity Access Network (IP-CAN) information and notifications, e.g., related to IP-CAN bearer level events.

For example, AF 113 may receive from PCRF 111 an indication that a particular service information is not accepted by PCRF 111, together with alternate service information that PCRF 111 may accept. In response, AF 113 may reject the service establishment towards a User Equipment (UE) which attempts to utilize such service. Optionally, AF 113 may forward to such UE the alternate service information that PCRF 111 may accept. Optionally, AF 113 may provide to PCRF 111 sponsored data connectivity information, and/or a usage threshold; and AF 113 may further request PCRF 111 to report events which may be related to sponsored data connectivity.

BBERF 114 may include a network element able to perform, for example, bearer binding; uplink bearer binding verification event reporting to PCRF 111; sending to PCRF 111, and/or receiving from PCRF 111, one or more IP-CAN-specific parameters; Service Data Flow (SDF) detection; and/or QoS control, such as, ensuring that the resources which may be used by (or reserved for, or allocated to) an authorized set of SDFs are within the authorized resources specified by an "authorized QoS" parameter.

TDF 115 may include a network element or other functional entity able to perform application detection or application traffic detection, as well as reporting of a detected application and its SDF description to PCRF 111 or to other suitable policy server or policy enforcement component. TDF 115 may further perform enforcement of one or more rules pertaining to network traffic, as further detailed herein.

TDF 115 may include, or may be associated with, an Application Identifier (AI) module 124, which may be able to monitor traffic and/or other parameters in order to identify the application (e.g., YouTube, Skype) and/or a type of application (e.g., streaming video, file sharing) that a subscriber utilizes or attempts to utilize. Optionally, such application identification may be performed by using (payload) data inspection techniques, and not only by relying upon standard or agreed classifications of known applications. Optionally, TDF 115 may include a payload data inspector to implement one or more (payload) data inspection techniques; or may otherwise utilize one or more Deep Packet Inspection (DPI) techniques.

Optionally, if TDF 115 is unable to provide to PCRF 111 a SDF, and/or if TDF 115 is able to provide to PCRF 111 a SDF, TDF 115 may implement gating, redirection, and bandwidth limitation with regard to the detected application(s). Alternatively, TDF 115 is able to provide to PCRF 111 a SDF description, operations resulting from application detection may be performed by gateway 116 (e.g., as part of the charging and policy enforcement per SDF) and/or by BBERF 114 (e.g., as bearer binding) and/or by TDF 115. Optionally, TDF 115 may further support usage monitoring, as well as usage reporting functions which may alternatively be performed by gateway 116.

If TDF 115 is unable to monitor particular events (e.g., related to location changes), then TDF 115 may at least provide to PCRF 111 event triggers requests, by utilizing, for example, an IP-CAN session establishment procedure, an IP-CAN session modification procedure (e.g., initiated by gateway 116), a response an IP-CAN session modification initiated by PCRF 111, and/or an update procedure for updating the subscription information in PCRF 111.

Gateway 116 may be a network element or node or cellular gateway (e.g., a Packet Data Network (PDN) Gateway (P-GW) or other suitable gateway) able to interface with one or more devices, systems and/or networks. For example, if General Packet Radio Service (GPRS) communications are used, gateway 116 may be implemented as a Gateway GPRS Support Node (GGSN). Gateway 116 may include Policy and Charging Enforcement Function (PCEF) 119, which may perform, for example, SDF detection; policy enforcement; flow-based charging; user plane traffic handling; triggering control plane session management; QoS handling; SDF measurement; and online and/or offline charging interactions. For example, PCEF 119 may operate to ensure that an IP packet, which is discarded at PCEF 119 as a result from policy enforcement or flow-based charging, is not reported for offline charging and does not cause credit consumption for online charging.

PCEF 119 may utilize one or more suitable methods to enforce policy control indicated by PCRF 111, for example: gate enforcement; QoS enforcement based on QoS class identifier correspondence with IP-CAN specific QoS attributes; Policy and Charging Control (PCC) rule QoS enforcement (e.g., to enforce uplink Differentiated Services Code Point (DSCP) marking according to an active PCC rule); and/or IP-CAN bearer QoS enforcement.

Optionally, PCEF 119 may control the QoS that is provided to a combined set of SDFs. For example, PCEF may ensure that the resources which may be used by an authorized set of SDFs are within the authorized resources specified by an "authorized QoS" parameter, which may indicate an upper bound for the resources that may be reserved (e.g., Guaranteed Bitrate or GBR) or allocated (e.g., Maximum Bitrate or MBR) for the IP-CAN bearer. The authorized QoS information may be mapped by PCEF 119 to IP-CAN specific QoS attributes. During IP-CAN bearer QoS enforcement, if packet filters are provided, then PCEF 119 may provide packet filters with the same content corresponding to the SDF template filters received.

PCEF 119 may further enforce charging control. For example, for a SDF (e.g., defined by an active PCC rule) that may be subject to charging control, PCEF 119 may allow the SDF to pass through PCEF 119 only if there is a corresponding active PCC rule and, for online charging, OCS 117 authorized credit for the suitable charging key. PCEF 119 may allow a SDF to pass through PCEF 119 during the course of credit re-authorization procedure.

For a SDF (e.g., defined by an active PCC rule) that is subject to both policy control and charging control, PCEF 119 may allow the SDF to pass through PCEF 119 only if both control conditions hold true; for example, only if the corresponding gate is open and also, in case of online charging, OCS 117 authorized credit for its charging key. Alternatively, for a SDF that is subject to policy control only and not charging control, PCEF 119 may allow the SDF to pass through PCEF 119 if the conditions for policy control are met.

PCEF 119 may be served by one or more PCRF nodes, which may be similar or identical to PCRF 111. For example, PCEF 119 may contact the appropriate PCRF node based on the Packet Data Network (PDN) connected to, and/or based on UE identity information (which, optionally, may be IP-CAN specific). PCEF 119 may support predefined PCC rules. Furthermore, PCEF 119 may modify or replace a (non-predefined) PCC rule, upon request from PCRF 111.

Optionally, PCEF 119 may inform PCRF 111 about the outcome of a PCC rule operation. For example, if network initiated procedures apply for the PCC rule, and the corresponding IP-CAN bearer may not be established or modified to satisfy the bearer binding, then PCEF 119 may reject the activation of the PCC rule. Upon rejection of PCC rule activation, PCRF 111 may modify the attempted PCC rule, may de-activate or modify other PCC rules, may retry activation of the PCC rule, or may abort the activation attempt, and may optionally inform AF 113 that transmission resources are not available.

OCS 117 may include a network module or server able to perform online charging; whereas OFCS 118 may include a network module or server able to perform offline charging. Charging may include a series of operations in which information related to a chargeable event is collected, formatted, and transferred in order to enable determination of usage for which the charged party (e.g., a subscriber) may be billed.

OFCS 118 may perform offline charging, such that charging information may not affect in real-time the service rendered. OFCS 118 may perform, for example, transaction handling, rating, and offline correlation and management of subscriber account balances.

OCS 117 may perform online charging, such that charging information may affect in real-time the service rendered, and therefore a direct interaction of the charging mechanism with bearer control, session control or service control may be required. OCS 117 may optionally include a SDF-based credit control module, which may perform real-time credit control; as well as real-time transaction handling, rating, and online correlation and management of subscriber account balances.

OCS 117 and/or OFCS 118 may utilize Charging Data Records (CDRs) 125, which may include a formatted collection of information about a chargeable event (e.g., time of call set-up, duration of the call, amount of data transferred, or the like) which may be used in billing and accounting. For each party (e.g., subscriber) to be charged, for parts the charges or for all charges of a chargeable event, a separate CDR 125 may be generated or utilized; and more than one CDR 125 may be generated for a single chargeable event, e.g. due to a long event duration, or if two or more charged subscribers are to be charged.

Optionally, CDRs 125, as well as OCS 117 and/or OFCS 118, may be associated with a billing domain 127, which may receive and process CDRs 125, and may provide billing mediation, statistical applications, or other billing-related applications. Optionally, billing domain 127 may be external to the core of system 101; yet it may be in communication with TDF 115, with OCS 117 and/or with OFCS 118, through suitable interfaces. It is noted that TDF 115 may be able to communicate, directly or indirectly, with billing domain 127, even though a link between TDF 115 and billing domain 127 is not shown in FIG. 1A, as to not over-crowd the drawing.

It is noted that various components may be implemented within a single or a common physical unit, or may be otherwise co-located. For example, one or more functions of TDF 115 and/or PCRF 111 and/or PCEF 119 may be implemented (in whole or in part) by using a policy server or other suitable component(s) or module(s). Such policy server, for example, may perform both the policy control decision functionality as well as the application-based charging control functionality. Optionally, the policy server may be implemented as a stand-alone entity within the mobile networks (e.g., as PCRF 111), or may be co-located with TDF 115 within the same unit or network entity. Optionally, TDF 115 may be implemented as a stand-alone entity within the mobile networks, or may be implemented as a sub-unit or module within gateway 116 (e.g., implemented as PDN Gateway (P-GW) or as GGSN) or within other local gateway (e.g., physically located near a radio network).

TDF 115 may be deployed in a home (non-roaming) network, as well as in a visited (roaming) network, both for home routed access and for local breakout scenarios. TDF 115 may be deployed in a local network, for example, near a local gateway which may be used both for traffic routed to the home network and for traffic routed locally.

Figure 1B:
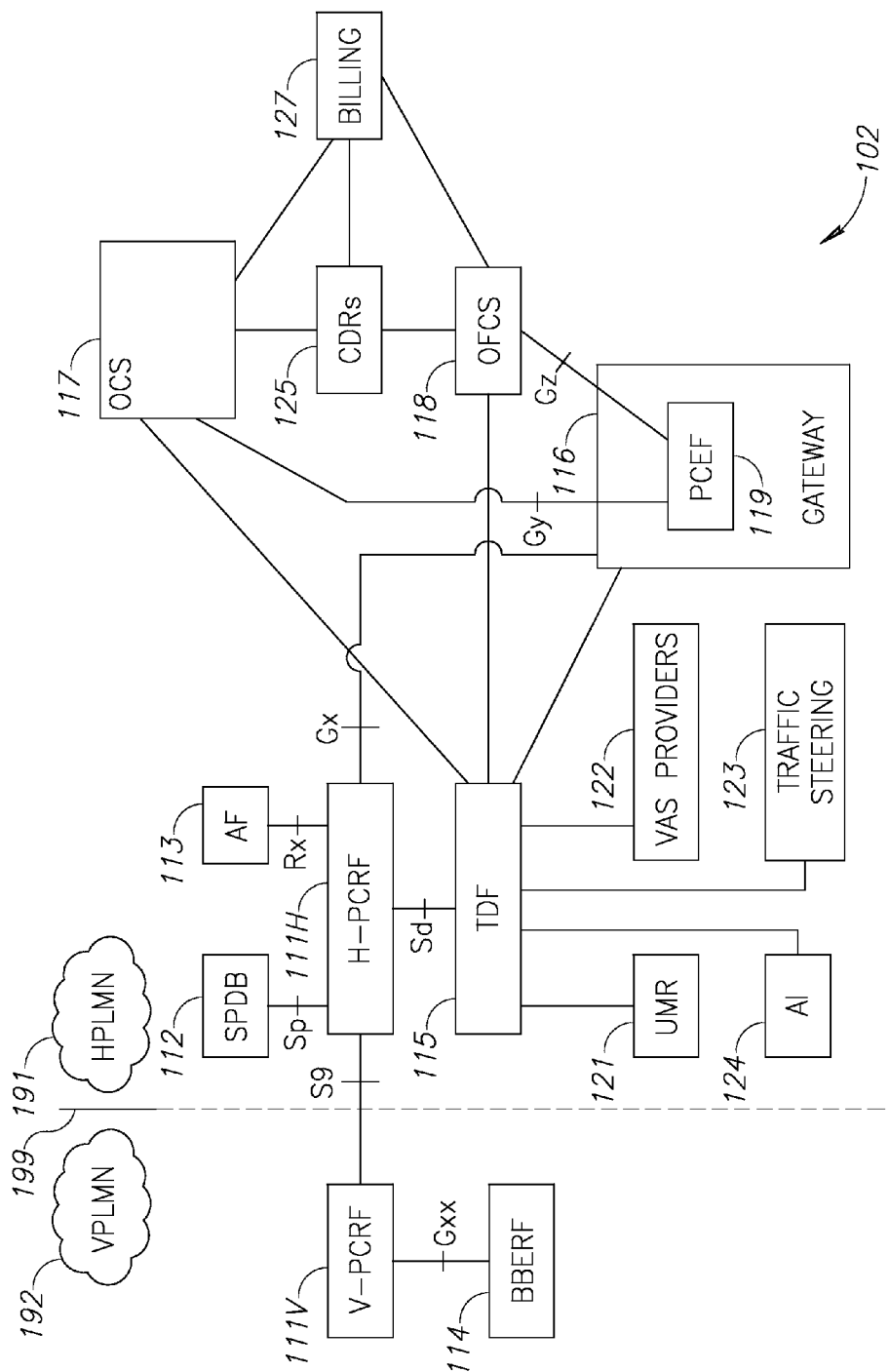

Reference is made to FIG. 1B, which is a schematic block-diagram illustration of a communication system 102 in accordance with the present invention. System 102 of FIG. 1B may be similar to system 101 of FIG. 1A. However, whereas system 101 of FIG. 1A may be associated with a single PLMN 190, system 102 of FIG. 1B may be associated with two (or more) cellular networks, for example, a Home PLMN (H-PLMN) 191 in which a subscriber may be regarded as non-roaming, and a Visited PLMN (V-PLMN) 192 in which the subscriber may be regarded as roaming. A dashed line 199 may indicate a separation between the two cellular networks, H-PLMN 191 and V-PLMN 192.

Furthermore, instead of having a single PCRF node, denoted PCRF 111 in FIG. 1A, system 102 of FIG. 1B may include two (or more) PCRF nodes, for example, a Home PCRF (H-PCRF) denoted 111H, and a Visited PCRF (V-PCRF) denoted 111V, which may be in communication with each other. All the components that are shown in FIG. 1A as connected to or associated with PCRF 111, may be connected to or associated with H-PCRF 111H in FIG. 1B; except for BBERF 114, which in system 102 may be connected to or associated with V-PCRF 111V rather than with H-PCRF 111H. The functionality of such components remains as described above. System 102 may demonstrate the logical architecture of PCC in a roaming scenario having home-routed access.

Figure 1C:
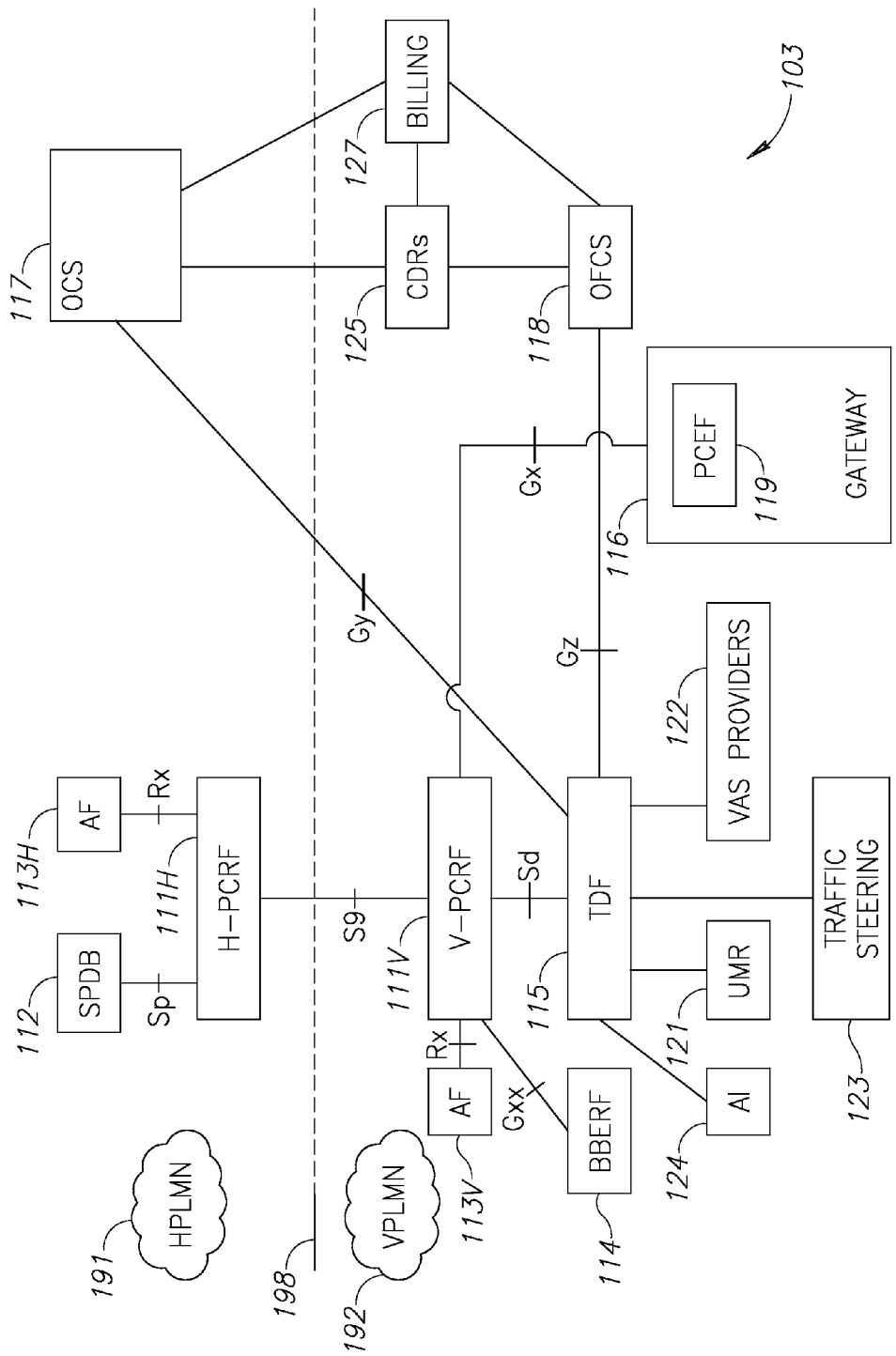

Reference is made to FIG. 1C, which is a schematic block-diagram illustration of a communication system 103 in accordance with the present invention. System 103 of FIG. 1C may be similar to system 102 of FIG. 1B. For example, system 103 of FIG. 1C may be associated with two (or more) cellular networks, for example, H-PLMN 191 in which a subscriber may be regarded as non-roaming, and V-PLMN 192 in which the subscriber may be regarded as roaming. A dashed line 199 may indicate a separation between the two cellular networks, H-PLMN 191 and V-PLMN 192.

Similarly to system 102 of FIG. 1B, system 103 of FIG. 1C may include two (or more) PCRF nodes, for example, H-PCRF 111H and V-PCRF 111V, which may be in communication with each other. Furthermore, each one of these PCRF nodes may be associated with a separate AF node, for example, AF 113H and AF 113V, respectively. System 103 may demonstrate the logical architecture of PCC in a roaming scenario in which PCEF 119 may be located in the visited cellular network, V-PLMN 12, optionally utilizing local breakout.

Referring back to FIG. 1A, system 101 may be used in order to perform various processes or operations based on the traffic detection functionality. The discussion herein demonstrates five demonstrative implementations of such operations; other suitable operations may be used. It is noted that two or more operations that are described herein may be performed in parallel, or may co-exist and concurrently apply to the cellular session of the same subscriber.

In a first demonstrative implementation, system 101 may be used to perform charging based on traffic detection functionality. For example, a cellular communication session of a subscriber may start. PCRF 111 may be informed about the start of the cellular session. Furthermore, PCRF 111 may be provided with one or more session parameters, e.g., subscriber identification, subscriber location, device characteristics, or the like.

PCRF 111 may then create Application Detection and Control (ADC) rules, and may provide them to TDF 115. The ADC rules may be based on the subscriber profile which may be received from SPDB 112. The ADC rules may include, for example, application identifiers corresponding to applications that are intended to be detected; one or more enforcement actions to be applied to identified applications, once detected; and charging directives for these applications, once detected.

The charging directives may include, per each one of the application identifiers, one or more parameters, for example, a charging key to determine the tariff to apply for the application, once detected; a charging method to indicate the required charging method (e.g., online charging, offline charging, or no charging); and a measurement method to indicate which application-related or traffic-related parameter is to be measured for charging purposes (e.g., application data volume, time duration, combined volume/duration, occurrence of a triggering event, or the like).

The ADC rules may be applied by TDF 115. For example, upon detection of the application, one or more of the actions may be enforced by TDF 115, in accordance with the relevant ADC rules. Then, TDF 115 may establish a connection with a charging server, for example, with OCS 117 or with OFCS 118, as indicated by the charging method information received from PCRF 111.

Optionally, if offline charging is required, TDF 115 may contact OFCS 117, or alternatively TDF may contact billing domain 127, e.g., directly or indirectly. TDF 115 may be configured to select between multiple communication routes for offline charging. Connection between TDF 115 and billing domain 127 may be established, for example, at session establishment, or upon creation of a first CDR 125 or at other suitable time. The connection may be established, for example, through an interface between TDF 115 and OCS 117; through an interface between TDF 115 and OFCS 118; or through an interface between TDF 115 and billing domain 127. TDF may further transfer the charging key to the suitable charging server, together with the application identifier.

Subsequent to establishment of connection between TDF 115 and a charging server, TDF 115 may receive charging acknowledgement from the charging server. If online charging is used, the charging acknowledgement may include an indication of the measurement method and/or the amount of granted data volume, duration, combined volume durations, or events for which charging was authorized by the charging server.

Optionally, the charging server may restrict the validity time for a grant. In such case, upon validity time expiration, TDF 115 may inform the charging server about used grant.

Optionally, the charging server may provide to TDF 115 one or more restriction indications, requiring to redirect or to terminate the application at a particular point in time. In such case, TDF 115 may enforce the restriction indications, and may transfer suitable notifications to PCRF 111.

TDF 115 may apply the required charging measurement method with the corresponding grant to the corresponding detected application (e.g., defined by the application identifier). Optionally, TDF 115 may send a notification to the charging server, for example, to indicate that TDF 115 received from PCRF 111 updated ADC rules, to indicate detection of application, to indicate grant expiration, to indicate an applied restriction action, or other suitable notification.

Upon termination of the cellular session, TDF 115 may receive a suitable message from PCRF 111; and TDF 115 may inform the charging server, with the used grants per each of the corresponding applications.

In a second demonstrative implementation, system 101 may be utilized for usage monitoring reporting based on traffic detection functionality. For example, a cellular communication session of a subscriber may start. PCRF 111 may be informed about the start of the cellular session. Furthermore, PCRF 111 may be provided with one or more session parameters, e.g., subscriber identification, subscriber location, device characteristics, or the like.

PCRF 111 may then create Application Detection and Control (ADC) rules, and may provide them to TDF 115. The ADC rules may be based on the subscriber profile which may be received from SPDB 112.

The ADC rules may include, for example, application identifiers for the applications to be detected. The ADC rules may further include one or more enforcement actions to be applied to such applications, upon their detection; and may further include usage monitoring directives for such applications, upon their detection.

The usage monitoring directives may include, per each one of the application identifiers, one or more parameters, for example, the event trigger to trigger the report from TDF 115 to PCRF 111, and/or the granted volume (e.g., in total, in uplink, or in downlink).

The ADC rules may be applied by TDF 115. For example, upon detection of the application, one or more of the actions may be enforced by TDF 115, in accordance with the relevant ADC rules. Furthermore, upon detection of the application, TDF 115 may begin to count the volume, per directive, received from PCRF 111.

At any point in time, or periodically, PCRF 111 may request from TDF 115 a report about used volume; and TDF 115 may provide such report to PCRF 111 upon such request.

At any point of time, or periodically, PCRF 111 may disable the usage monitoring that TDF is performing. Such disablement may be performed separately and/or selectively, per each monitored applications. Upon such disablement, TDF 115 may report the used volume to PCRF 111, and then TDF may disable the usage monitoring.

At any point of time, upon grant exhaustion, TDF 115 may report to PCRF 111 by using the provisioned event trigger.

At any point of time, or periodically, PCRF 111 may send updated volume grants to TDF 115, and TDF 115 may then utilize the updated values.

Optionally, PCRF 111 may deactivate the ADC rules; and in such case, TDF 115 may report the used volume PCRF 111 and may then disable the usage monitoring.

Upon session termination, TDF 115 may receive a corresponding message from PCRF 111. Then, TDF 115 may inform PCRF 111 with the used grants per each of the corresponding applications that were subject to usage monitoring.

In a third demonstrative implementation, system 101 may be utilized for providing VAS based on traffic detection functionality. For example, a cellular communication session of a subscriber may start. PCRF 111 may be informed about the start of the cellular session. Furthermore, PCRF 111 may be provided with one or more session parameters, e.g., subscriber identification, subscriber location, device characteristics, or the like.

PCRF 111 may then create Application Detection and Control (ADC) rules, and may provide them to TDF 115. The ADC rules may be based on the subscriber profile which may be received from SPDB 112.

The ADC rules may include, for example, application identifiers for the applications to be detected. The ADC rules may further include one or more enforcement actions to be applied to such applications, upon their detection; and may further include VAS for the specified subscriber's session. Such VAS may include, for example, parental control, anti-virus or anti-malware protection or scanning, content filtering, caching, video optimization, or other suitable services. Optionally, one or more VAS may be added, in parallel, to the same subscriber's session.

Optionally, the VAS description as received form PCRF 111, may further include one or more parameters. For example, if an indicated VAS is "parental control", a suitable parameter may indicate a type or profile of parental control intended to be applied.

The VAS may be applied by TDF 115, and/or by other suitable component(s) able to provide VAS (e.g., one or more VAS providers 122). Optionally, TDF 115 may steer traffic to VAS providers 122, and TDF 115 may route traffic back from VAS providers 122 to the cellular network.

Upon session termination, TDF 115 may receive the corresponding message from PCRF 111, and may deactivate or terminate the VAS.

In a fourth demonstrative implementation, system 101 may be utilized for traffic routing based on traffic detection functionality. For example, gateway 116 may be a local gateway which may perform both offloading and routing to the core network. TDF 115 may be above gateway 116, or TDF 115 may be collocated with gateway 116; and the network operator may use gateway 116 for both offloaded traffic and routed traffic. Optionally, some traffic may be offloaded locally; while traffic for operator services may also utilize the same gateway 116 but may be routed within the operator's network.

A cellular communication session of a subscriber may start. PCRF 111 may be informed about the start of the cellular session. Furthermore, PCRF 111 may be provided with one or more session parameters, e.g., subscriber identification, subscriber location, device characteristics, or the like.

PCRF 111 may then create Application Detection and Control (ADC) rules, and may provide them to TDF 115. The ADC rules may be based on the subscriber profile which may be received from SPDB 112.

The ADC rules may include, for example, application identifiers for the applications to be detected. The ADC rules may further include one or more enforcement actions to be applied to such applications, upon their detection; and may further include routing rules for such applications, upon their detection.

TDF 115 may apply the ADC rules. For example, upon detection of the application, one or more of the actions may be enforced by TDF 115, in accordance with the ADC rules. Furthermore, based on the type of the detected application, and based on the received routing rules, TDF 115 may perform traffic routing, for example, either locally or to the mobile operator's network.

In a fifth demonstrative implementation, system 101 may be utilized for traffic steering based on traffic detection functionality. For example, gateway 116 may be a local gateway which may perform traffic offloading; and a separate gateway may be used for traffic routing in the operator's core network. TDF 115 may be above gateway 116, or TDF 115 may be collocated with gateway 116. Optionally, some traffic may be offloaded locally; while traffic for operator services may be routed within the operator's network by using the separate gateway.

A cellular communication session of a subscriber may start. Traffic may be offloaded locally, for example, based on Access Point Name (APN).

PCRF 111 may be informed about the start of the cellular session. Furthermore, PCRF 111 may be provided with one or more session parameters, e.g., subscriber identification, subscriber location, device characteristics, or the like.

PCRF 111 may then create Application Detection and Control (ADC) rules, and may provide them to TDF 115. The ADC rules may be based on the subscriber profile which may be received from SPDB 112.

The ADC rules may include, for example, application identifiers for the applications to be detected. The ADC rules may further include one or more enforcement actions to be applied to such applications, upon their detection; and may further include re-routing rules or steering rules for such applications, upon their detection.

TDF 115 may apply the ADC rules. For example, upon detection of the application, one or more of the actions may be enforced by TDF 115, in accordance with the ADC rules. Furthermore, based on the type of the detected application, and based on the received re-routing rules or steering rules, TDF 115 may perform traffic re-routing or traffic steering. For example, TDF 115 may re-route traffic to the operator's network, e.g., for one or more VAS which may be available at the operator's network.

Figure 2:
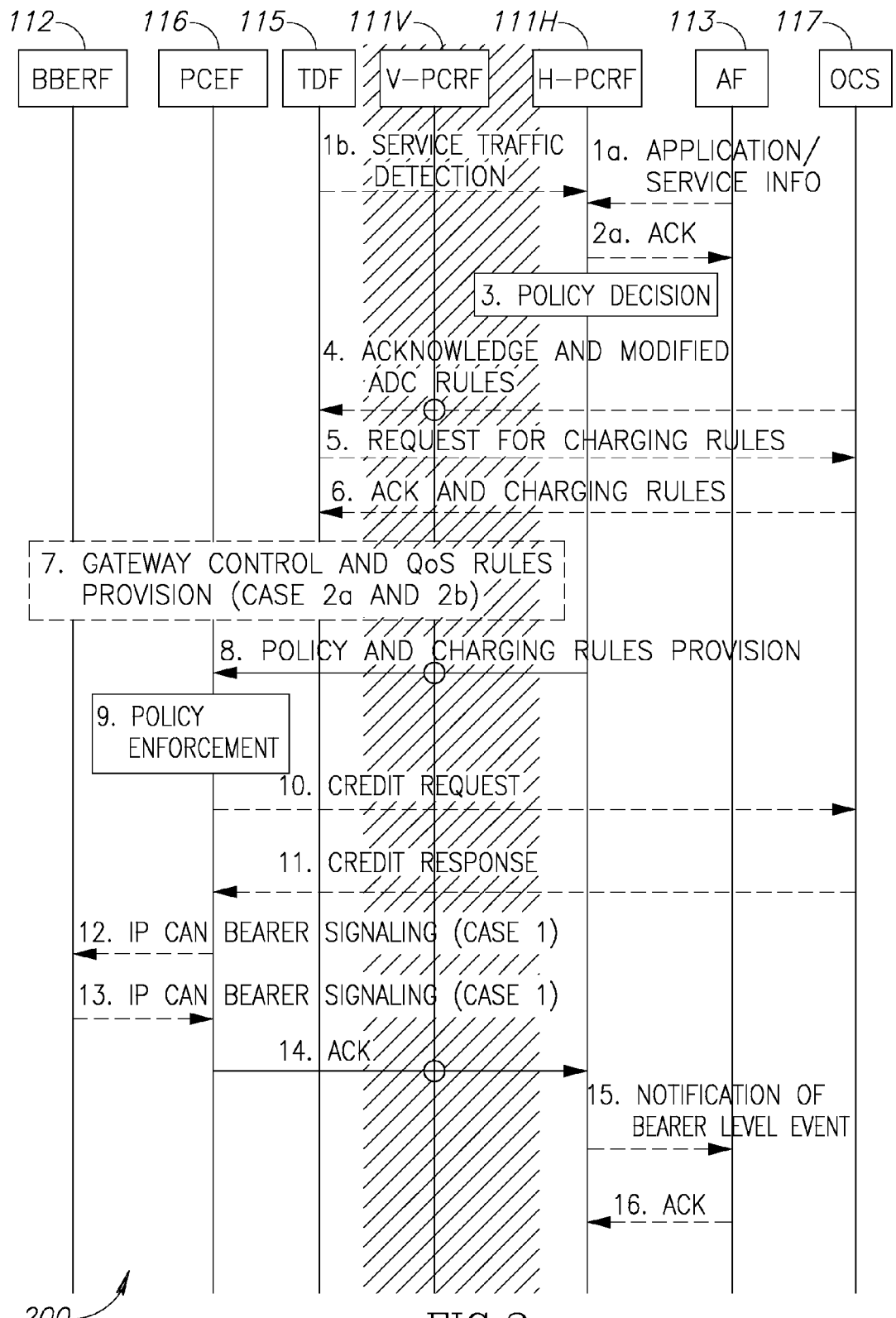
FIG. 2 is a schematic diagram demonstrating a flow in accordance with the present invention.

Reference is made to FIG. 2, which is a diagram 200 demonstrating a flow in accordance with the present invention. Diagram 200 may demonstrate signaling among components of system 102 of FIG. 1B, or among components system 103 of FIG. 1C.

Diagram 200 may also demonstrate signaling by components of system 101 of FIG. 1A, if the two PCRF nodes (PCRF 111V and PCRFH) are regarded as a single PCRF node (PCRF 111).

For demonstrative purposes, the discussion herein may refer to diagram 200 in conjunction with a possible usage by system 102 of FIG. 1B. Diagram 200 may demonstrate establishment of a connection between TDF 115 and OCS 117 as a result of application detection in accordance with ADC rules.

AF 113 may signal to H-PCRF 111H an application or service information (arrow 1a); and TDF 115 may signal to H-PCRF 111H service traffic detection (arrow 1b).

H-PCRF 111H may signal an acknowledgment (ACK) back to AF 113 (arrow 2), and may perform a policy decision to create or modify ADC rules (block 3).

The created or modified ADC rules, together with acknowledgment, may be sent by H-PCRF 111H to TDF 115 (arrow 4), optionally passing through V-PCRF 111V.

Upon receiving the ADC rules, TDF 115 may send to OCS 117 a request for charging rules (arrow 5). In response, OCS 117 may send to TDF 115 an acknowledgment (ACK) together with the relevant charging rules (arrow 6).

Then, gateway control and provisioning of QoS rules may be performed, for example, by BBERF 112, by PCEF 116, by TDF 115, by H-PCRF 111H, and optionally by V-PCRF 111V (block 7). For example, H-PCRF 111H may provide policy and charging rules to PCEF 116 (arrow 8), and PCEF 116 may enforce the policy and rules (block 9).

Optionally, a credit request may be signaled by PCEF 116 to OCS 117 (arrow 10); and a credit response may be signaled back by OCS 117 to PCEF 116 (arrow 11).

Optionally, IP-CAN bearer signaling may be performed from PCEF 116 to BBERF 112 (arrow 12), and subsequently from BBERF 112 to PCEF 116 (arrow 13). An acknowledgement may then be signaled from PCEF 116 to H-PCRF 111H (arrow 14), optionally passing through V-PCRF 111V. Finally, H-PCRF 111H may notify AF 113 about bearer level event (arrow 15), and may receive from AF 113 an acknowledgement in response (arrow 16).

The above-mentioned flow and signaling may be utilized in conjunction with charging, and/or with other suitable operations or processes.

Figure 3A:
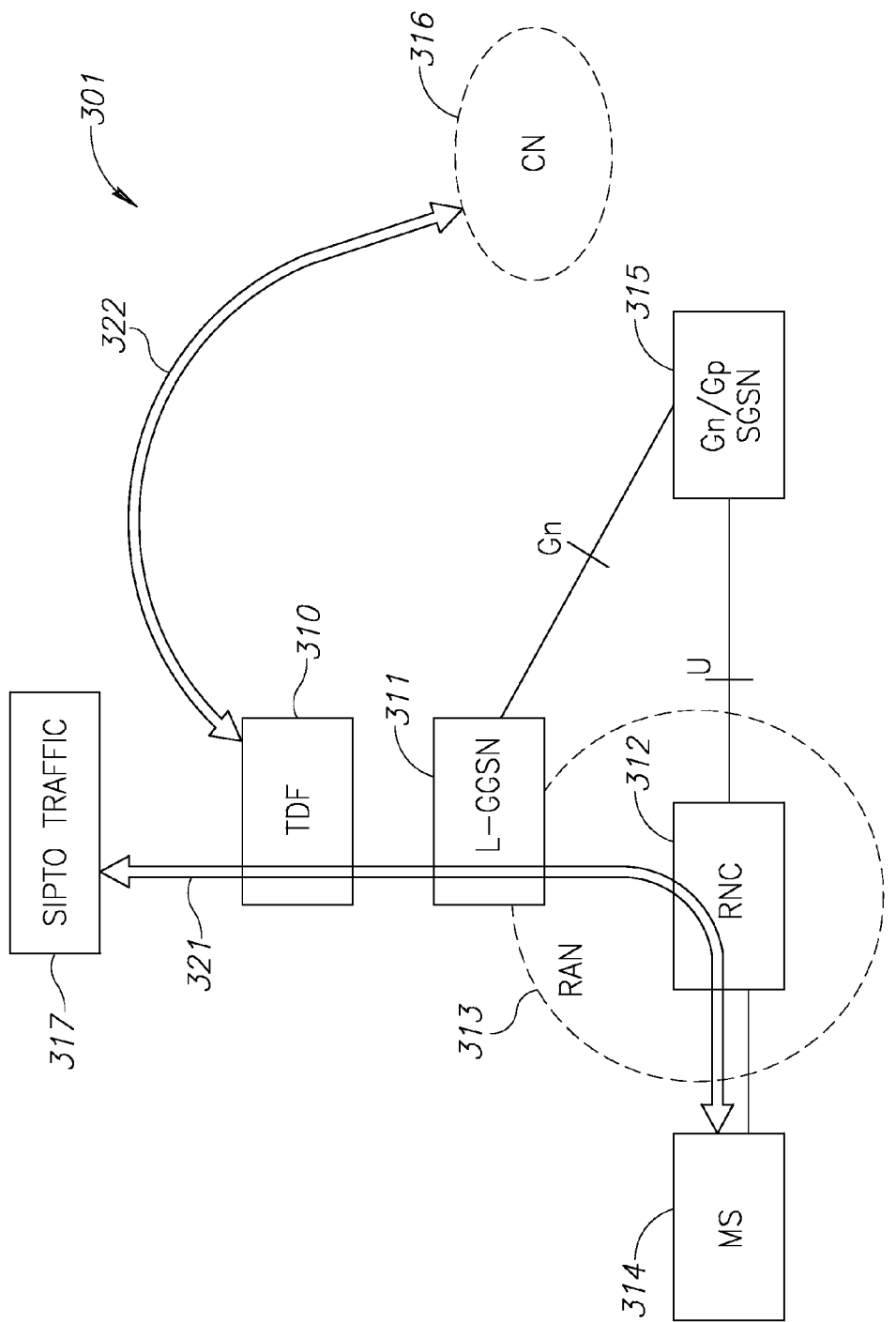
FIGS. 3A-3B are schematic block diagram illustrations of communication systems demonstrating Selected IP Traffic Offload (SIPTO), in accordance with the present invention.

Reference is made to FIG. 3A, which is a schematic block diagram illustration of a communication system 301 demonstrating Selected IP Traffic Offload (SIPTO), in accordance with the present invention. System 301 may include, for example, a Mobile Station (MS) 314, a Radio Access Network (RAN) 313 including at least one Radio Network Controller (RNC) 312, a Local GGSN (L-GGSN) 311, a TDF 310, a Serving GPRS Support Node (SGSN) 315 having Gn/Gp interface, and a Core Network (CN) 316.

As indicated by an arrow 321, traffic may flow, for example, from MS 314 to RNC 312; may proceed from RNC 312 to L-GGSN 311; and may then proceed from L-GGSN 311 to TDF 310. Then, TDF 310 may steer or route traffic, either as conventional SIPTO traffic 317, or through a short-cut (indicated by an arrow 322) to CN 316.

L-GGSN 311 may serve as local gateway for offloading traffic, as well as for routing traffic to CN 316. TDF may be implemented above L-GGSN 311, or may be collocated with L-GGSN 311; and the network operator may utilize L-GGSN 311 for handling both types of traffic, i.e., offloaded traffic and routed traffic.

Optionally, some traffic may be offloaded locally by L-GGSN 311; whereas traffic for operator services may utilize L-GGSN 311 but may be routed within the operator's network; optionally. Based on the type of detected traffic, TDF 310 may perform differential routing or steering.

Optionally, offloading policies may be sent to TDF 310, for example, by PCRF 311 or, optionally, pre-provisioned at TDF 310. Optionally, TDF 310 may perform traffic steering upon detection for TCP services.

Figure 3B:
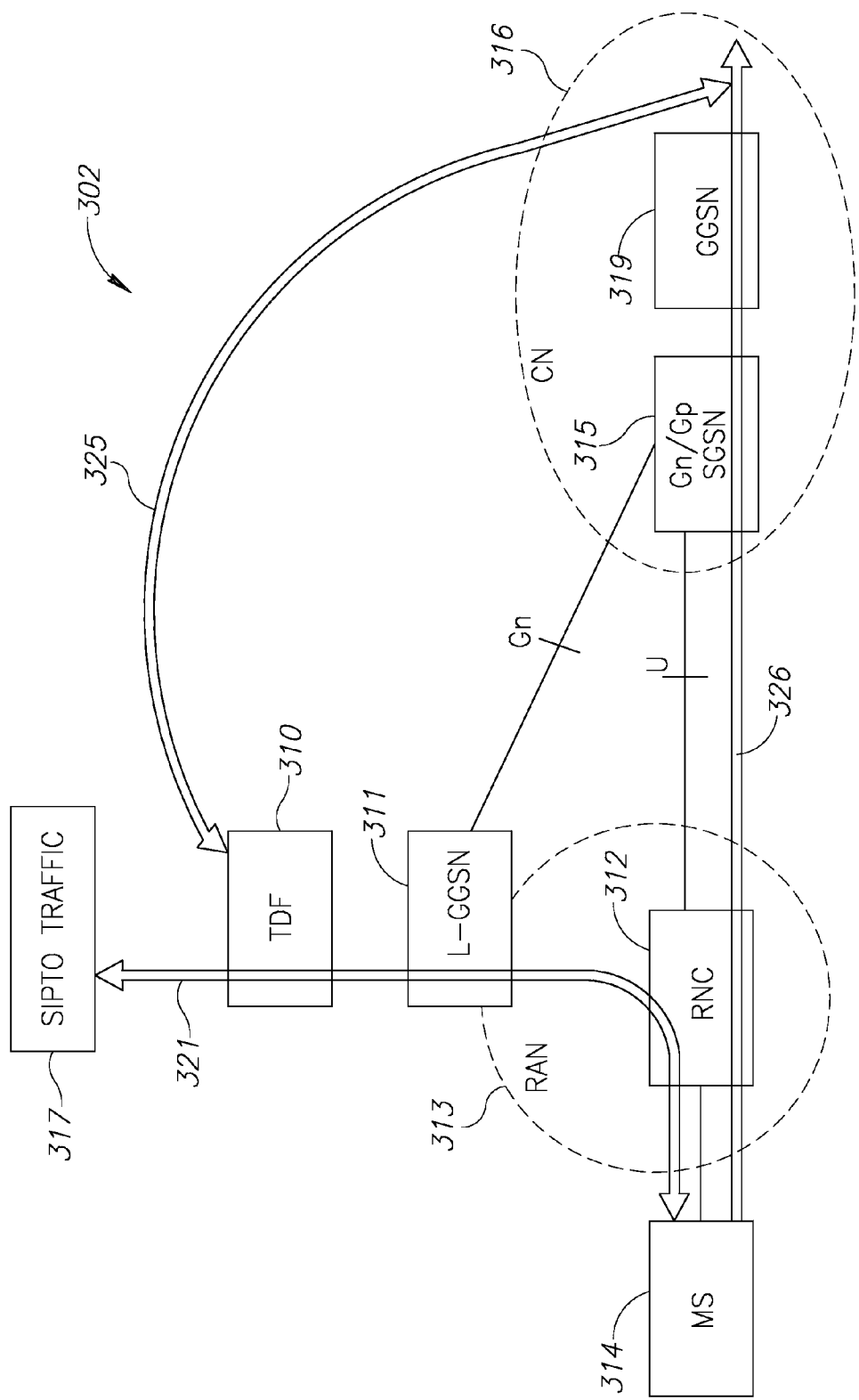

Reference is made to FIG. 3B, which is a schematic block diagram illustration of a communication system 302 demonstrating SIPTO, in accordance with the present invention. System 302 of FIG. 3B may be generally similar to system 301 of FIG. 3A; yet in system 302, both SGSN 315 and a GGSN 319 may be part of CN 316.

As indicated by an arrow 321, traffic may flow, for example, from MS 314 to RNC 312; may proceed from RNC 312 to L-GGSN 311; and may then proceed from L-GGSN 311 to TDF 310. Then, TDF 310 may steer or route traffic, either as conventional SIPTO traffic 317, or through a short-cut (indicated by an arrow 322) to CN 316.

L-GGSN 311 may serve as local gateway for offloading traffic, as well as for routing traffic to CN 316. TDF may be implemented above L-GGSN 311, or may be collocated with L-GGSN 311.

Optionally, some traffic may already be offloaded, for example, Internet traffic which may be offloaded per Access Point Name (APN). TDF 310 may recognize that a particular type of the traffic (e.g., streaming video) and a particular type of application (e.g., YouTube application or Skype application) may be routed to CN 316, for example, in order to apply additional services (e.g., video caching). TDF 310 may thus route such traffic directly to CN 316 (as indicated by an arrow 325), for example, instead of locally routing the traffic to the Internet (arrow 321).

Optionally, offloading policies may be transferred to TDF 310, for example, from PCRF 311 or, optionally, pre-provisioned at TDF 310. Optionally, TDF 310 may perform traffic steering upon detection for TCP services.

Referring to both FIGS. 3A and 3B, the SIPTO provided by systems 301 or 302 may optionally be modified. For example, a Home Subscriber Server (HSS) (not shown) may include, for each subscriber, also an indication (e.g., per APN) of whether SIPTO is enabled or disabled. Optionally, in Long Term Evolution (LTE) and/or 4G networks, a Serving Gateway (S-GW) may utilize Tracking Area ID (TAI) or NodeB ID, for example, during Domain Name System (DNS) interrogation to find the PDN gateway ID. Optionally, in 3G networks, SGSN 315 may utilize Routing Area Identity (RAI) or an ID of serving RNC 312. Optionally, in a roaming scenario, SIPTO may not be generally available for the home routed traffic; yet SIPTO may be available for a local breakout.

Figure 4A:
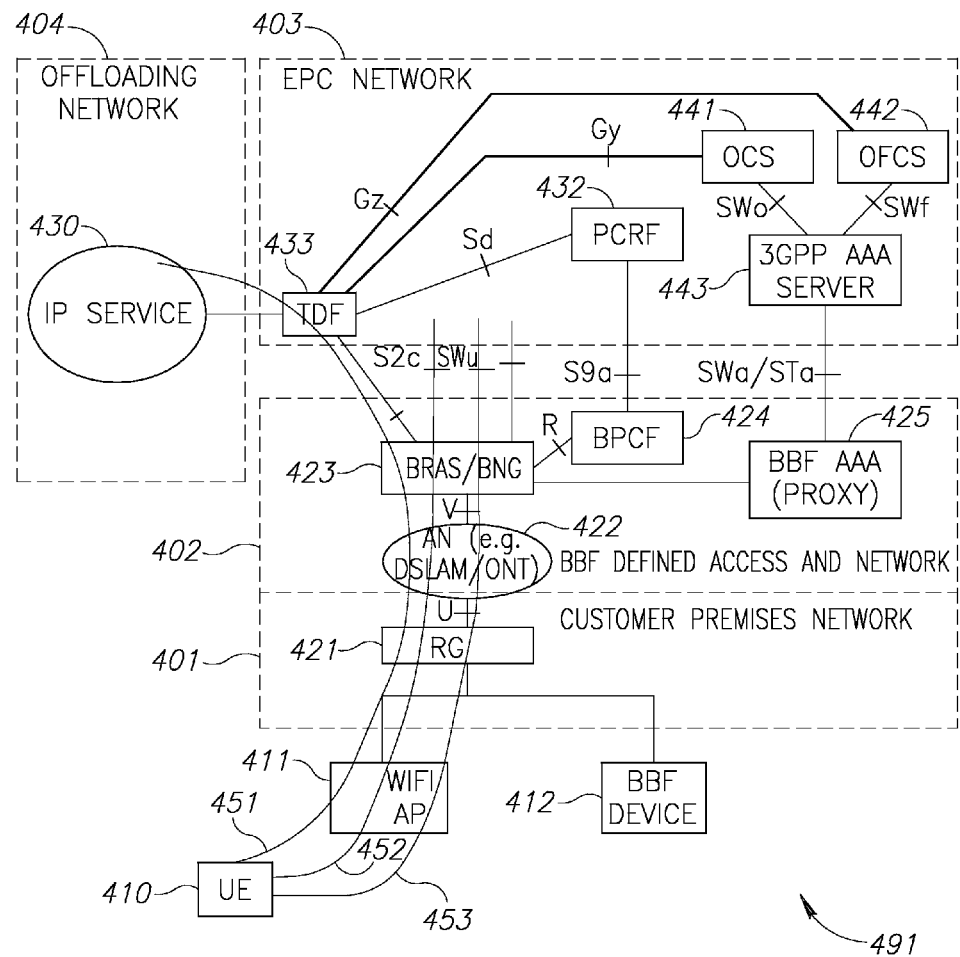
FIGS. 4A-4D are schematic block diagram illustrations of systems demonstrating flow of traffic and/or signaling through multiple networks, in accordance with the present invention.

Reference is made to FIG. 4A, which is a schematic block diagram illustration of a system 491 demonstrating flow of traffic and/or signaling through multiple networks, in accordance with the present invention. System 491 may demonstrate Wireless LAN (WLAN) offload by using TDF, depicted in a non-roaming scenario. System 491 may include, for example, a User Equipment (UE) 410, a customer services network 401, a Broadband Forum (BBF) network 402, an Evolved Packet Core (EPC) network 403, and an offloading network 404 to which traffic may be offloaded. System 491 may be utilized to transfer offloaded traffic (e.g., indicated by a path 451) and/or non-offloaded traffic (e.g., indicated by paths 452 and 453).

UE 410 may communicate with customer premises network 401, for example, wirelessly through a wireless Access Point (AP) 411. Optionally, a BBF device 412 may similarly communicate with customer premises network 401.

In customer premises network 401, traffic may be routed through a Routing Gateway (RG) 421 to BBF network 402. In BBF network 402, an Access Network (AN) 422, for example, a Digital Subscriber Line (DSL) Access Multiplexer (DSLAM) box or an Optical Network Terminal (ONT), may route the traffic further to a Broadband Remote Access Server (BRAS)/Broadband Network Gateway (BNG) 423.

From BRAS/BNG 423, traffic may be routed to EPC network 403. For example, signaling may flow towards EPC network 403, either directly; or via a BBF Policy Control Function (BPCF) 424 which may be in communication with a PCRF 432 of EPC 403; or via a BBF Authentication, Authorization and Accounting (AAA) proxy 425 which may be in communication with a 3GPP AAA server 443 of EPC network 403.

Optionally, BRAS/BNG 423 may route traffic to TDF 433 (which may be similar to TDF 115 of FIG. 1A), which in turn may steer or route the traffic to offloading network 404, which may include an IP service 430 (e.g., in an operator-managed domain); or to other suitable component in EPC network 403, for example, to PCRF 432. Furthermore, EPC network 403 may include an OCS 441 and/or an OFCS 442, which may be in communication with 3GPP AAA server 443, and may optionally be in direct communication with TDF 433.

System 491 may support both online charging and offline charging. Optionally, separate accounting data may be provided for offloaded traffic and for home routed traffic. EPC network 403 may control the accounting and charging; and system 491 may allow volume-based, time-based and/or event-based accounting and charging. System 491 may utilized ADC rules which may include control for charging parameters (e.g., transferred from PCRF 432 to TDF 433) to allow charging for offloaded traffic. Optionally, the accounting or charging information may be provided at application level. Optionally, the accounting or charging information may be provided at TDF 433 session level. The communication between TDF 433 and OCS 441 and/or OFCS 442 may be implemented, for example, similar to a Gy/Gz interface.

Figure 4B:
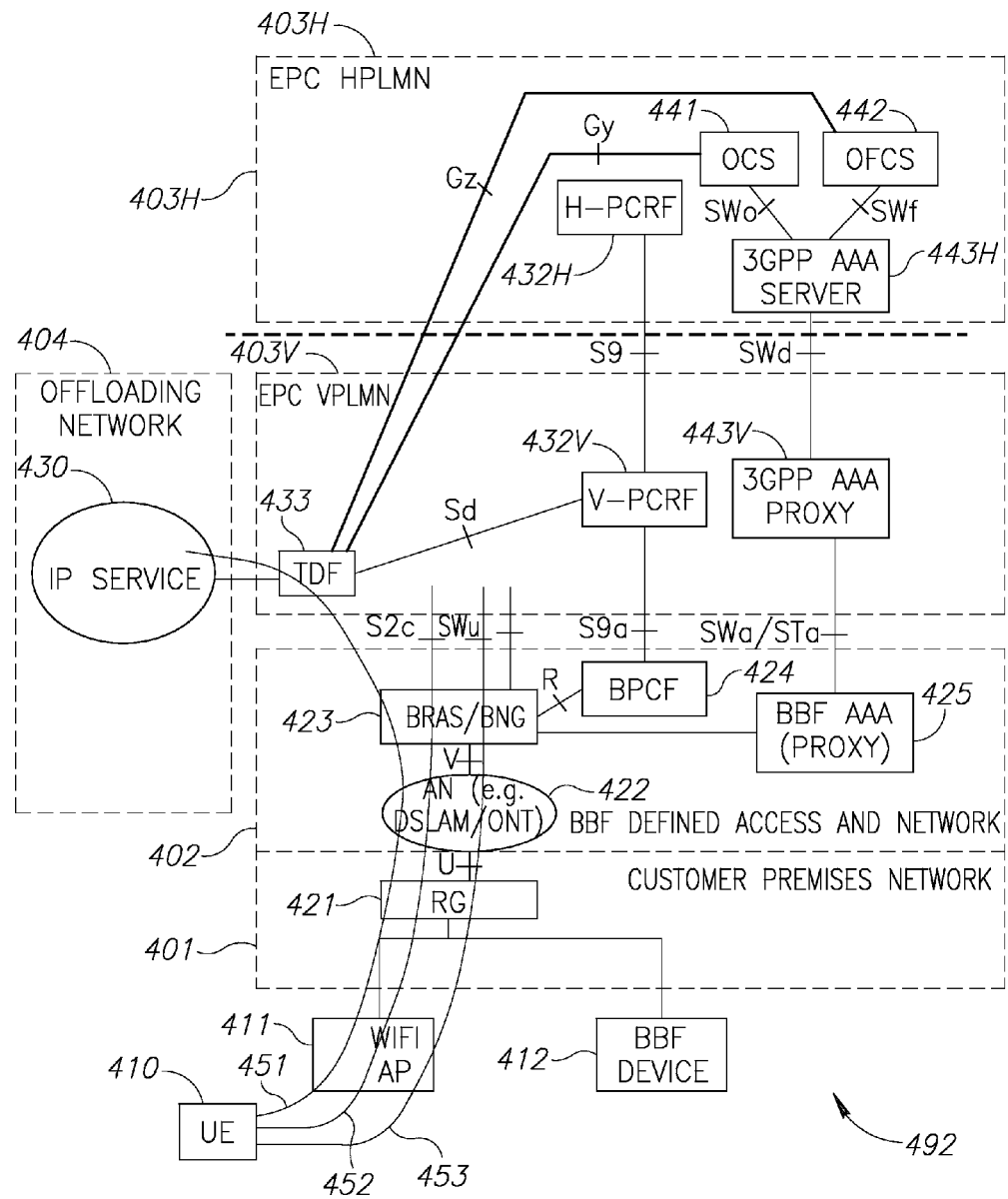

Reference is made to FIG. 4B, which is a schematic block diagram illustration of a system 492 demonstrating flow of traffic and/or signaling through multiple networks, in accordance with the present invention. System 492 may demonstrate Wireless LAN (WLAN) offload by using TDF, depicted in a roaming scenario. System 492 of FIG. 4A may be generally similar to system 491 of FIG. 4A; however, instead of having a single EPC network 403 as in system 491, system 492 may have two EPC networks, for example, an EPC V-PLMN 403V (which may include TDF 433) and an EPC H-PLMN 403H. For example, traffic and/or signaling may flow from EPC V-PLMN 403V and an EPC H-PLMN 403H; for example, from a V-PCRF node 432V to a H-PCRF node 432H; and from a 3GPP AAA proxy 443V to a 3GPP AAA server 443H.

Figure 4C:
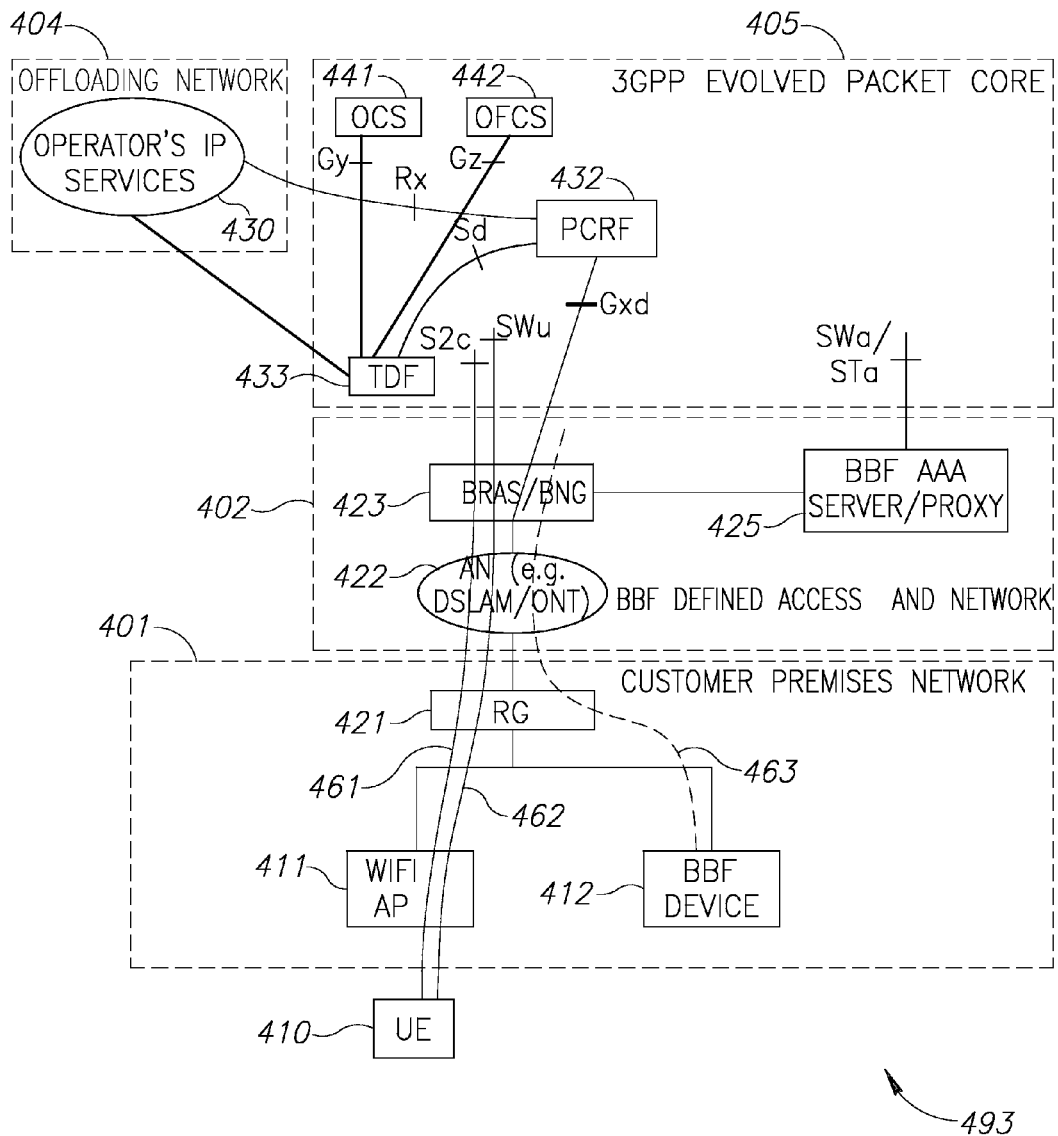

Reference is made to FIG. 4C, which is a schematic block diagram illustration of a system 493 demonstrating flow of traffic and/or signaling through multiple networks, in accordance with the present invention. System 493 may demonstrate non-roaming architecture for fixed broadband access interworking traffic offloaded to Broadband Network Gateway (BNG) (e.g., Converged PCRF). System 493 may include, for example, a User Equipment (UE) 410 able to communicate with customer premises network 401; and system 493 may further include BBF defined access and network 402, a 3GPP EPC network 405, and an offloading network 404. Paths 461 and 462 may demonstrate signaling and/or traffic routing associated with traffic that flows to or from UE 410; whereas a path 463 may demonstrate signaling and/or traffic routing associated with traffic that flows to or from BBF device 412.

Optionally, BRAS/BNG 423 may route traffic to TDF 433 (which may be similar to TDF 115 of FIG. 1A), which in turn may steer or route the traffic to offloading network 404, which may include an IP service 430 (e.g., in an operator-managed domain); or to other suitable component in EPC network 405, for example, to PCRF 432. Furthermore, EPC network 405 may include an OCS 441 and/or an OFCS 442, which may be in communication with 3GPP AAA server 443, and may optionally be in direct communication with TDF 433.

System 493 may support both online charging and offline charging. Optionally, separate accounting data may be provided for offloaded traffic and for home routed traffic. EPC network 405 may control the accounting and charging; and system 493 may allow volume-based, time-based and/or event-based accounting and charging. System 493 may utilized ADC rules which may include control for charging parameters (e.g., transferred from PCRF 432 to TDF 433) to allow charging for offloaded traffic. Optionally, the accounting or charging information may be provided at application level. Optionally, the accounting or charging information may be provided at TDF 433 session level. The communication between TDF 433 and OCS 441 and/or OFCS 442 may be implemented, for example, similar to a Gy/Gz interface.

Figure 4D:
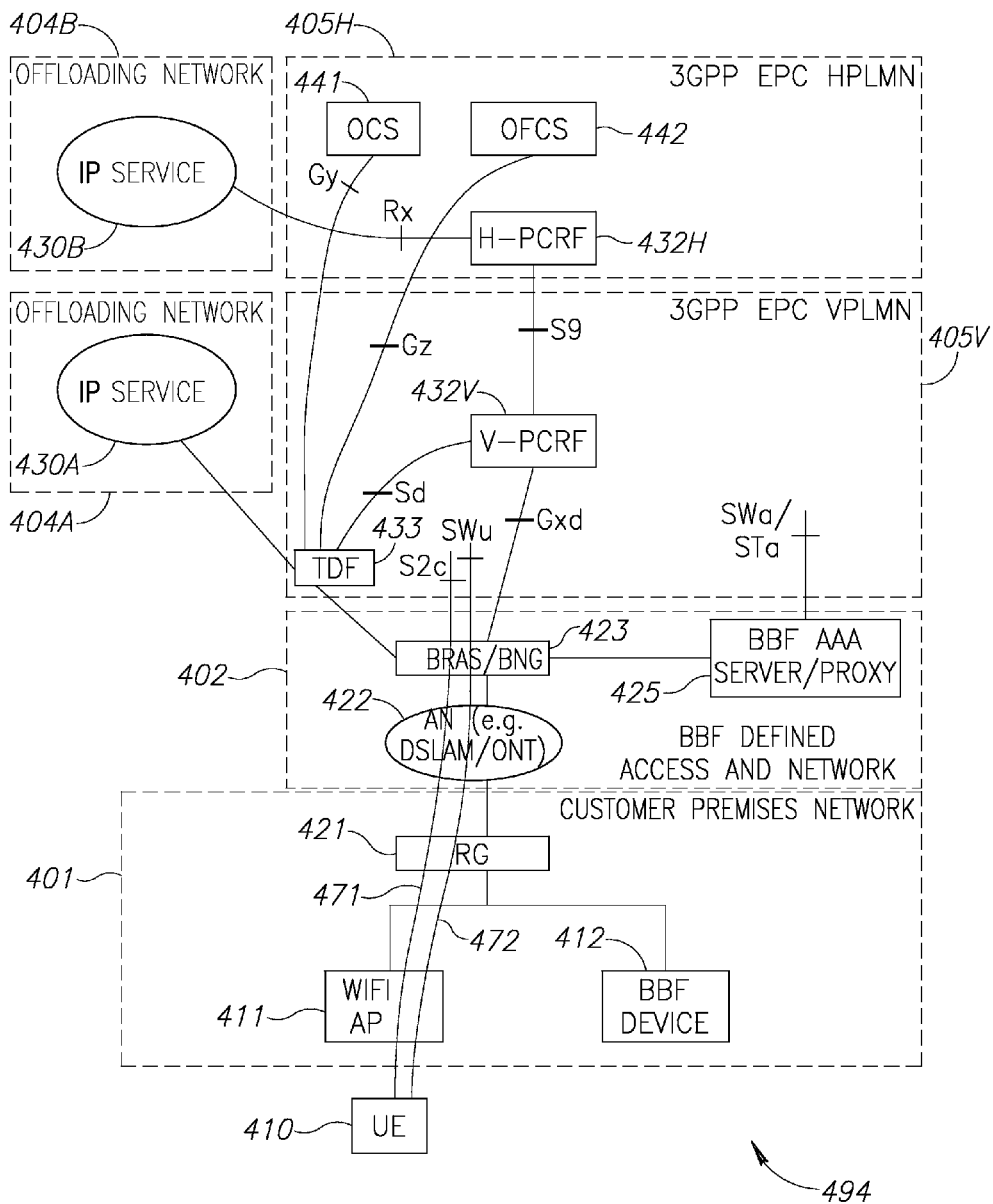

Reference is made to FIG. 4D, which is a schematic block diagram illustration of a system 494 demonstrating flow of traffic and/or signaling through multiple networks, in accordance with the present invention. System 494 may be generally similar to system 493 of FIG. 4C; however, system instead of having a single EPC network 403 as in system 493, system 494 may have two EPC networks, for example, an EPC V-PLMN 405V (which may include TDF 433) and an EPC H-PLMN 405H. For example, traffic and/or signaling may flow from EPC V-PLMN 405V to EPC H-PLMN 405H; for example, from a V-PCRF node 432V to a H-PCRF node 432H; and from a 3GPP AAA proxy 443V to a 3GPP AAA server 443. Similarly, each EPC (405V, 405H) may be associated with a corresponding offloading network (404A, 404B), which in turn may include operator's IP services (430A, 430B). Routing and/or signaling may be demonstrated by paths 471-472. Optionally, TDF 433 within EPC 405V may be in direct communication with OCS 441 of EPC 405H, and/or with OFCS 442 of EPC 405H, and/or with IP service 430A of offloading network 404A.

Optionally, BRAS/BNG 423 may route traffic to TDF 433 (which may be similar to TDF 115 of FIG. 1A), which in turn may steer or route the traffic to offloading network 404A, which may include an IP service 430A (e.g., in an operator-managed domain); or to other suitable component in EPC network 405V, for example, to V-PCRF node 432V. In turn, V-PCRF node 432V may be in communication with H-PCRF node 432H of EPC 405H. Furthermore, EPC network 405H may include an OCS 441 and/or an OFCS 442, which may be in communication with 3GPP AAA server 443, and may optionally be in direct communication with TDF 433 of EPC network 405V. Optionally, TDF 433 may be in direct contact with OCS 441 and/or OFCS 442, even though they may be belong to another cellular network.

System 494 may support both online charging and offline charging. Optionally, separate accounting data may be provided for offloaded traffic and for home routed traffic. EPC networks 405H and/or 405V may control the accounting and charging; and system 494 may allow volume-based, time-based and/or event-based accounting and charging. System 494 may utilized ADC rules which may include control for charging parameters (e.g., transferred from PCRF 432H to PCRF 432V to TDF 433) to allow charging for offloaded traffic. Optionally, the accounting or charging information may be provided at application level. Optionally, the accounting or charging information may be provided at TDF 433 session level. The communication between TDF 433 and OCS 441 and/or OFCS 442 may be implemented, for example, similar to a Gy/Gz interface With regard to FIGS. 4A-4D, it is noted that direct communication may exist between TDF 433 and OCS 441, which may be located in the same EPC network or in another EPC network. Similarly, direct communication may exist between TDF 433 and OFCS 442, which may be located in the same EPC network or in another EPC network. Furthermore, direct communication may exist between TDF 433 and IP service 430, which may be located in another network (e.g., offloading network 404). It is further clarified that although the drawings may depict traffic routing paths and/or signaling paths, BPCF 424 may be on the signaling path (and not on traffic routing path); and similarly, BBF AAA servers or proxies may be on the signaling path (and not on traffic routing path).

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A cellular traffic monitoring system comprising:
    a policy and charging rules function (PCRF) module to create a set of application detection and control (ADC) rules;
    a bearer binding and event reporting function (BBERF) module to perform bearer binding and to detect a service data flow (SDF) associated with communications of a cellular subscriber device;
    an SDF-based policy charging and enforcement function (PCEF) module to enforce one or more charging rules to said cellular subscriber device, based on SDF data;
    an online charging system (OCS) connected to said SDF-based PCEF module and able to perform SDF-based online charging based on data received from said SDF-based PCEF module;
    an offline charging system (OFCS) connected to said SDF-based PCEF module and able to perform SDF-based offline charging based on data received from said SDF-based PCEF module;
    a traffic detection function (TDF) module, implemented as a separate module from said PCEF module; wherein the TDF module is connected directly to said OCS; wherein the TDF module is connected directly to said OFCS;
    a billing domain module, connected to said OCS and said OFCS;
    wherein the TDF module is (a) to monitor cellular traffic associated with a cellular subscriber device, (b) to perform payload data inspection by using a Deep Packet Inspection (DPI) technique, (c) to apply said Application Detection and Control (ADC) rules in order to detect an application running on said cellular subscriber device, and (d) to generate detection output which includes at least one of:
        a type of an application associated with said cellular traffic of said cellular subscriber device, and
        a type of said cellular traffic of said cellular subscriber device;
    and (e) to generate application-based detection output that enables at least one of the OCS and the OFCS to apply, on per-application basis, different charging rate to different applications being used over a cellular network in which said cellular subscriber device operates;
    wherein a same cellular communication session is subject to both (i) SDF-based charging based on output from the PCEF module, and (b) application-based charging based on output from the TDF module;
    wherein at least one of said OCS and OFCS, is to perform application-based differential charging towards said cellular subscriber device based on application-based detection output that was generated by the TDF module by using said DPI technique and by applying said ADC rules,
    wherein at least one of said OCS and OFCS is to perform subscriber account correlation which takes into account, for a same cellular communication session of a same subscriber account, both (i) SDF-based charging based on output from the PCEF module, and (b) application-based charging based on output from the TDF module; wherein said PCRF module is to define a for said cellular subscriber device an increased charging rate based on detection, by the TDF module, that said cellular subscriber device is utilizing a particular application.

2. The cellular traffic monitoring system of claim 1, further comprising an online charging server (OCS) to receive the detection output from the TDF module and to perform online charging.

3. The cellular traffic monitoring system of claim 1, further comprising an offline charging server (OFCS) to receive the detection output from the TDF module and to perform offline charging.

4. The cellular traffic monitoring system of claim 1, further comprising:
a policy and charging rules function (PCRF) module to create a set of application detection and control (ADC) rules, and to provide the ADC rules to be enforced by the TDF module based on said detection output.

5. The cellular traffic monitoring system of claim 4, wherein the ADC rules comprise one or more traffic routing rules.

6. The cellular traffic monitoring system of claim 4, wherein the ADC rules comprise one or more traffic steering rules.

7. The cellular traffic monitoring system of claim 4, wherein the ADC rules comprise one or more traffic offloading rules.

8. The cellular traffic monitoring system of claim 4, wherein the ADC rules comprise one or more rules indicating that one or more supplemental services are to be applied to said cellular traffic.

9. The cellular traffic monitoring system of claim 8, wherein the one or more supplemental services comprise one or more services selected from the group consisting of: parental control service, content filtering service, anti-virus services, anti-malware service, quality of service (QoS) enforcement service, and bandwidth limiting service.

10. The cellular traffic monitoring system of claim 4, wherein the ADC rules comprise one or more rules for generating usage monitoring reports.

11. The cellular traffic monitoring system of claim 4, wherein the TDF module is in direct communication with at least one of:
an online charging server (OCS) of said system;
an offline charging server (OFCS) of said system;
a billing domain of said system.

12. The cellular traffic monitoring system of claim 4, wherein the TDF module comprises a payload data inspector to generate the detection output by utilizing a payload data inspection technique.

13. The cellular traffic monitoring system of claim 1, further comprising:
a first policy and charging rules function (PCRF) module, located in a first cellular network, to create a set of application detection and control (ADC) rules applicable to the first cellular network, and to transfer the ADC rules to a second PCRF module located in a second cellular network.

14. The cellular traffic monitoring system of claim 13, wherein the second PCRF module is to enforce, in the second cellular network, the ADC rules received from the first PCRF module and generated in the first cellular network.

15. The cellular traffic monitoring system of claim 1, wherein the PCEF module is comprised in a cellular gateway.

16. The cellular traffic monitoring system of claim 1, wherein the TDF module is to perform traffic offloading to an offloading network based on said detection output.

17. The cellular traffic monitoring system of claim 1, wherein the TDF module is to steer traffic from a home packet data network (PDN) to a local breakout.

18. The cellular traffic monitoring system of claim 1, wherein said detection output of said TDF module is transferred to said PCEF module indirectly via a policy and charging rules function (PCRF) module.

19. The cellular traffic monitoring system of claim 1, wherein said detection output of said TDF module is transferred to said PCEF module by via packet marking.

20. A method of cellular traffic monitoring, the method comprising:
at a policy and charging rules function (PCRF) module, creating a set of application detection and control (ADC) rules;
at a bearer binding and event reporting function (BBERF) module, performing bearer binding and detecting a service data flow (SDF) associated with communications of a cellular subscriber device;
at an SDF-based policy charging and enforcement function (PCEF) module, enforcing one or more charging rules to said cellular subscriber device, based on SDF data;
at an online charging system (OCS) connected to said SDF-based PCEF module, performing SDF-based online charging based on data received from said SDF-based PCEF module;
at an offline charging system (OFCS) connected to said SDF-based PCEF module, performing SDF-based offline charging based on data received from said SDF-based PCEF module;
at a traffic detection function (TDF) module, performing: (a) monitoring cellular traffic associated with a cellular subscriber device, (b) performing payload data inspection by using a Deep Packet Inspection (DPI) technique, (c) applying said Application Detection and Control (ADC) rules in order to detect an application running on said cellular subscriber device, (d) generating detection output which includes at least one of:
a type of an application associated with said cellular traffic of said cellular subscriber device, and
a type of said cellular traffic of said cellular subscriber device;
and (e) generating application-based detection output that enables at least one of the OCS and the OFCS to apply, on per-application basis, different charging rate to different applications being used over a cellular network in which said cellular subscriber device operates;
wherein the TDF module is implemented as a separate module from said PCEF module;
wherein the TDF module is connected directly to said OCS; wherein the TDF module is connected directly to said OFCS; wherein a billing domain is connected to said OCS and to said OFCS;
wherein a same cellular communication session is subject to both (i) SDF-based charging based on output from the PCEF module, and (b) application-based charging based on output from the TDF module;
performing, by at least one of said OCS and OFCS, application-based differential charging towards said cellular subscriber device based on application-based detection output that was generated by the TDF module by using said DPI technique and by applying said ADC rules;

performing, by at least one of said OCS and OFCS, subscriber account correlation which takes into account, for a same cellular communication session of a same subscriber account, both (i) SDF-based charging based on output from the PCEF module, and (b) application-based charging based on output from the TDF module;

wherein said PCRF module is to define an increased charging rate for said cellular subscriber device based on detection, by the TDF module, that said cellular subscriber device is utilizing a particular application.

* * * * *